United States Patent
Yu

(10) Patent No.: US 8,388,227 B2
(45) Date of Patent: Mar. 5, 2013

(54) HYDRODYNAMIC BEARING ASSEMBLY AND MOTOR HAVING THE SAME

(75) Inventor: Chang Jo Yu, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 379 days.

(21) Appl. No.: 12/662,917

(22) Filed: May 11, 2010

(65) Prior Publication Data

US 2011/0101807 A1 May 5, 2011

(30) Foreign Application Priority Data

Oct. 29, 2009 (KR) .................. 10-2009-0103708

(51) Int. Cl.
*F16C 32/06* (2006.01)
(52) U.S. Cl. ........................... 384/119; 384/100
(58) Field of Classification Search .............. 384/100, 384/107–124
See application file for complete search history.

(56) References Cited

U.S. PATENT DOCUMENTS

| | | | |
|---|---|---|---|
| 5,658,080 A * | 8/1997 | Ichiyama | 384/112 |
| 6,888,278 B2 * | 5/2005 | Nishimura et al. | 384/119 |
| 6,900,567 B2 | 5/2005 | Aiello et al. | |
| 2004/0247213 A1 * | 12/2004 | Dittmer et al. | 384/132 |
| 2006/0002641 A1 * | 1/2006 | Ichiyama | 384/100 |
| 2007/0206890 A1 * | 9/2007 | Kim | 384/119 |

FOREIGN PATENT DOCUMENTS

| | | |
|---|---|---|
| JP | 2005-155912 | 6/2005 |
| JP | 2008-306916 | 12/2008 |
| KR | 1999-020696 | 3/1999 |
| KR | 10-0733259 | 6/2007 |

OTHER PUBLICATIONS

Chinese Office Action mailed Apr. 28, 2012 issued in corresponding Chinese Patent Application No. 201010184860.7.
Korean Office Action issued Feb. 9, 2011 in corresponding Korean Patent Application 10-2009-0103708.

* cited by examiner

*Primary Examiner* — Thomas R Hannon

(57) ABSTRACT

A hydrodynamic bearing assembly according to an aspect of the invention may include: a sleeve against which a shaft is supported so that an upper end of the shaft, being compressed and inserted into a hub base of a rotor case, protrudes upwardly in an axial direction; a first oil sealing unit having a first oil interface provided between the hub base and a counterpart component arranged downwardly in the axial direction; and a second oil sealing unit communicating with the first oil sealing unit through a communication channel and being tapered to form a second oil interface inside or outside the sleeve, wherein oil in the first oil sealing unit moves toward the second oil sealing unit along an inner diameter direction by a rotation of the rotor case.

16 Claims, 5 Drawing Sheets

HYDRODYNAMIC BEARING ASSEMBLY AND MOTOR HAVING THE SAME

CROSS-REFERENCE TO RELATED APPLICATIONS

This application claims the priority of Korean Patent Application No. 10-2009-0103708 filed on Oct. 29, 2009, in the Korean Intellectual Property Office, the disclosure of which is incorporated herein by reference.

BACKGROUND OF THE INVENTION

1. Field of the Invention

The present invention relates to a hydrodynamic bearing assembly that can ensure the reliability of oil sealing and a motor having the same.

2. Description of the Related Art

A small-sized spindle motor, which is used in a recording disc driving device, uses a hydrodynamic bearing assembly. While oil is disposed between a shaft and a sleeve of the hydrodynamic bearing assembly, the shaft is driven by fluid pressure generated by the oil.

In line with improved performance of recording disc driving devices, the demand for low current, low Non Repeatable Run Out (NNRO), impact resistance and vibration resistance has increased.

Furthermore, as a shaft rotates at high speed, research into oil sealing has been conducted in order to solve the problems wherein the oil inside the hydrodynamic bearing assembly splashes outside the hydrodynamic bearing assembly.

Meanwhile, in the hydrostatic assembly, an upper or lower end of a shaft hole in a sleeve, into which a shaft is inserted, is tapered so that oil undergoes taper sealing.

The bearing span of the shaft is decreased due to the above-described taper sealing, so that it becomes difficult for the shaft to stably support a rotor.

In recent years, as a sintered sleeve containing large amounts of oil has been used, oil interfaces have greatly varied due to the thermal expansion of the oil. Taper sealing that allows for changes in the oil interfaces is required to prevent overflow of the oil, which makes it more difficult to support the rotor.

SUMMARY OF THE INVENTION

An aspect of the present invention provides a hydrodynamic bearing assembly that increases the bearing span of a shaft to allow the shaft to stably support a rotor and forms two oil interfaces at different positions to increase oil capacity and prevent overflow of oil, and a motor having the same.

According to an aspect of the present invention, there is provided a hydrodynamic bearing assembly including: a sleeve against which a shaft is supported so that an upper end of the shaft, being compressed and inserted into a hub base of a rotor case, protrudes upwardly in an axial direction; a first oil sealing unit having a first oil interface provided between the hub base and a counterpart component arranged downwardly in the axial direction; and a second oil sealing unit communicating with the first oil sealing unit through a communication channel and being tapered to form a second oil interface inside or outside the sleeve, wherein oil in the first oil sealing unit moves toward the second oil sealing unit along an inner diameter direction by a rotation of the rotor case.

The counterpart component may be the sleeve.

The second oil sealing unit may include a communication hole extending along an outer diameter direction of the sleeve and inclined downwardly in the axial direction, and the second oil surface is provided within the communication hole.

The counterpart component may be the sleeve or an oil sealing cap having an upper surface in the same plane as an upper surface of the sleeve.

The second oil sealing unit may have the second oil interface between an outer surface of the sleeve along the outer diameter direction and an inner surface of the oil sealing cap along the inner diameter direction forming a tapered space with the outer surface of the sleeve along the outer diameter direction.

The hydrodynamic bearing assembly may further include a sleeve housing engaged with an outer circumferential surface of the sleeve to support the sleeve, wherein the counterpart component is the sleeve or an oil sealing cap covering an outer circumferential surface of the sleeve housing.

The second oil sealing unit may have a second oil interface between an outer surface of the sleeve housing along an outer diameter direction and an inner surface of the oil sealing cap along the inner diameter direction forming a tapered space with the outer surface of the sleeve housing.

A pumping groove may be provided in at least one of a lower surface of the hub base and an upper surface of the counterpart component, the pumping groove located further outside along the outer diameter direction than the communication channel.

The counterpart component may be the sleeve.

The counterpart component may be the sleeve or an oil sealing cap having an upper surface in the same plane as an upper surface of the sleeve.

The hydrodynamic bearing assembly may further include a sleeve housing engaged with an outer circumferential surface of the sleeve to support the sleeve, wherein the counterpart component is the sleeve or an oil sealing cap covering an outer circumferential surface of the sleeve housing.

The pumping groove may have a spiral shape or an in-pump herringbone shape.

According to another aspect of the present invention, there is provided a motor including: the hydrodynamic bearing assembly of claim 1 supporting a shaft; a stator having a support to which the hydrodynamic bearing assembly is fixed; and a rotor having a magnet generating an electromagnetic force by interaction between a coil of the stator and the magnet.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
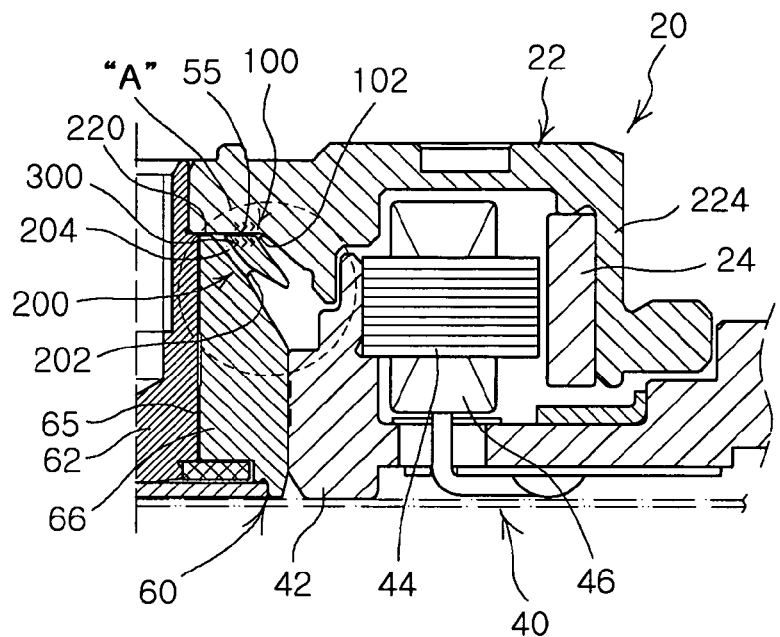
FIG. 1 is a schematic sectional view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Figure 2:
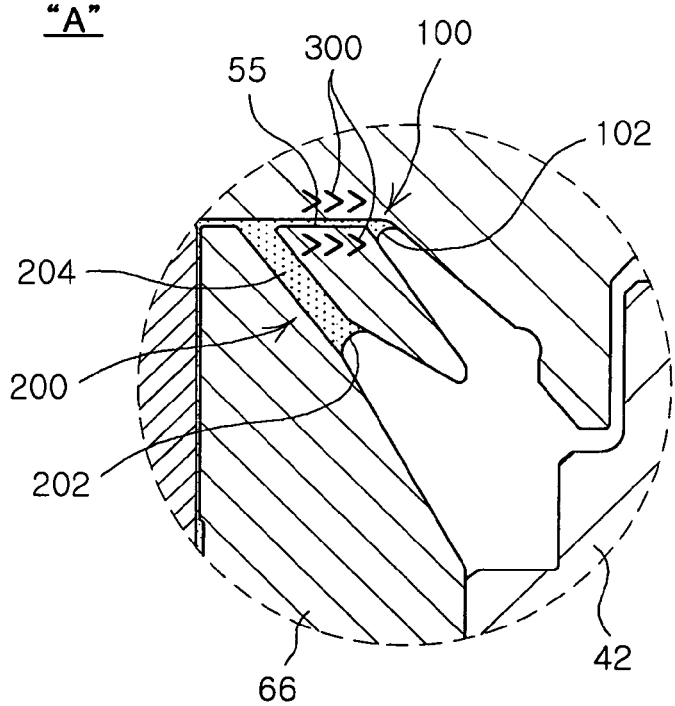
FIG. 2 is a schematic enlarged sectional view illustrating a portion A of FIG. 1.

FIG. 1 is a schematic cross-sectional view illustrating a motor according to an exemplary embodiment of the invention. FIG. 2 is a schematic enlarged sectional view illustrating a portion A of FIG. 1.

Referring to FIGS. 1 and 2, a motor 10 according to this embodiment may include a hydrodynamic bearing assembly 60, a stator 40 and a rotor 20.

The hydrodynamic bearing assembly 60 may be disposed at the inside of a support 42 of the stator and be fixed thereto. The hydrodynamic bearing assembly 60 may include a sleeve 66, a first oil sealing unit 100 and a second oil sealing unit 200.

Exemplary embodiments of the hydrodynamic bearing assembly 60 will be described below. The motor 10 according to this embodiment may have all the specific features of the respective exemplary embodiments of the hydrodynamic bearing assembly 60.

The rotor 20 may have a rotor case 22, shaped like a cup, which has a magnet 24, shaped like a ring, corresponding to coils 46 of the stator 40 along the outer circumference thereof. The magnet 24 is a permanent magnet that has north and south magnetic poles alternately arranged in a circumferential direction to generate a magnetic field having a predetermined magnitude.

Here, the rotor case 22 includes a hub base 220 and a magnet support 224. The hub base 220 is pressed against an upper end of a shaft 62 and is fixed. The magnet support 224 extends from the hub base 220 along an outer diameter direction and is bent downwardly in an axial direction to thereby support the magnet 24 of the rotor 20.

As viewed in FIG. 1, the axial direction refers to a vertical direction on the basis of the shaft 62, and an inner or outer diameter direction refers to a direction of an exterior end of the rotor 20 on the basis of the shaft 62 or a central direction of the shaft 62 on the basis of the exterior end of the rotor 20.

The stator 40 includes the support 42 engaged with the outer circumferential surface of the hydrodynamic bearing assembly 60 to fix the hydrodynamic bearing assembly 60, a plurality of cores 44 fixed to the support 42, and coils 46 wound around the cores 44.

The rotor 20 rotates by electromagnetic interaction between the coils 46 and the magnet 24.

Hereinafter, the respective exemplary embodiments of the hydrodynamic bearing assembly according to the invention will be described in detail.

First, the technical features that the respective exemplary embodiments have in common are that the hydrodynamic bearing assembly 60 may include the sleeve 66, the first oil sealing unit 100 and the second oil sealing unit 200.

The sleeve 66 supports the shaft 62 so that the upper end of the shaft 62 protrudes upwardly in the axial direction.

Here, the shaft 62 is inserted into a shaft hole 65 of the sleeve 66 with a fine gap therebetween. Oil fills the fine gap, thereby supporting the rotation of the rotor 20 by dynamic pressure generated by radial dynamic pressure grooves formed along the inner diameter of the sleeve 66.

The first oil sealing unit 100 has a first oil interface 102 between the hub base 220 and a counterpart component arranged downwardly along the axial direction.

Furthermore, the second oil sealing unit 200 communicates with the first oil sealing unit, has a second oil interface 202 outside the sleeve 66 and is tapered to seal oil.

First, in the hydrodynamic bearing assembly according to the embodiment, shown in FIGS. 1 and 2, the counterpart component forming the first oil sealing unit 100 together with hub base 220 may be the sleeve 66.

The oil is sealed in the fine gap between the hub base 220 and the sleeve 66 by capillary action.

An upper end of the sleeve 66 along the outer diameter direction may be inclined downwardly in the axial direction during molding so that the first oil interface 102 of the first oil sealing unit 100 may be tapered at the outside of the sleeve 66 along the outer diameter direction thereof.

The second oil sealing unit 200 includes a communication hole 204 that extends along the outer diameter direction of the sleeve 66 and is inclined downwardly in the axial direction. The second oil interface 202 may be formed in the communication hole 204.

Here, the oil in the first oil sealing unit 100 may move along the inner diameter direction due to the rotation of the rotor case 22 and toward the second oil sealing unit 200 through a communication channel 55.

The communication channel 55 may be formed between an upper surface of the sleeve 66 and a lower surface of the hub base 220 and communicate with the communication hole 204 of the second oil sealing unit 200.

In order that the oil is moved by the rotation of the rotor case 22, pumping grooves 300 may be formed in an upper part of the sleeve 66 at the inside of the communication hole 204 along the inner diameter direction thereof.

Here, the pumping grooves 300 may be formed in at least one of the lower surface of hub base 220 and the upper surface of the sleeve 66.

Here, the pumping grooves 300 may be formed outside along the outer diameter direction than the communication channel 55 so that the oil in the first oil sealing unit 100 can smoothly move toward the second oil sealing unit 200.

The pumping grooves 300 are arranged adjacent to the first oil sealing unit 100, so that the oil in the first oil sealing unit 100 can smoothly move to the second oil sealing unit 200 by the rotation of the motor.

The pumping grooves 300 will be described below.

Figure 3:
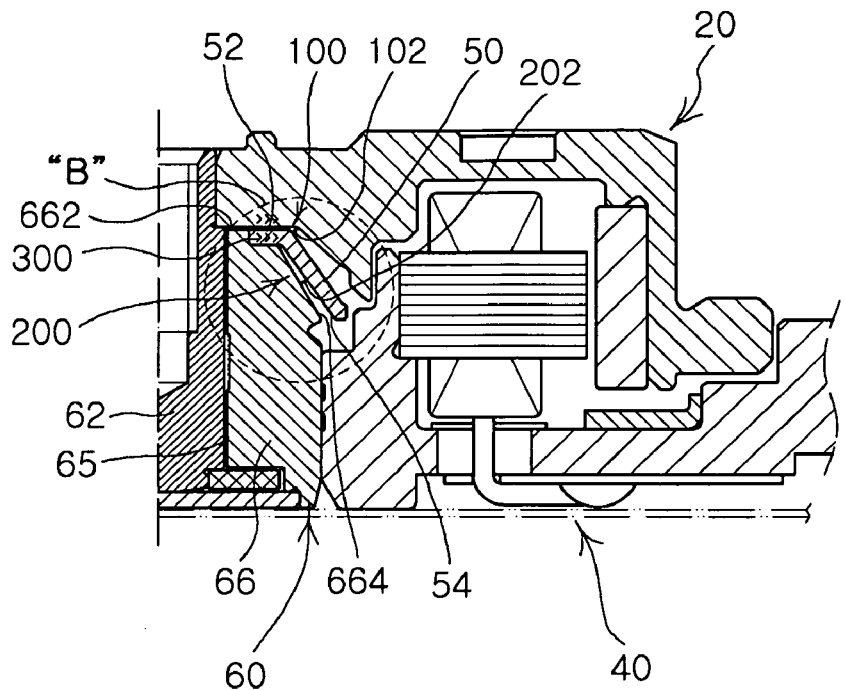
FIG. 3 is a schematic sectional view illustrating a motor according to another exemplary embodiment of the present invention.
Figure 4:
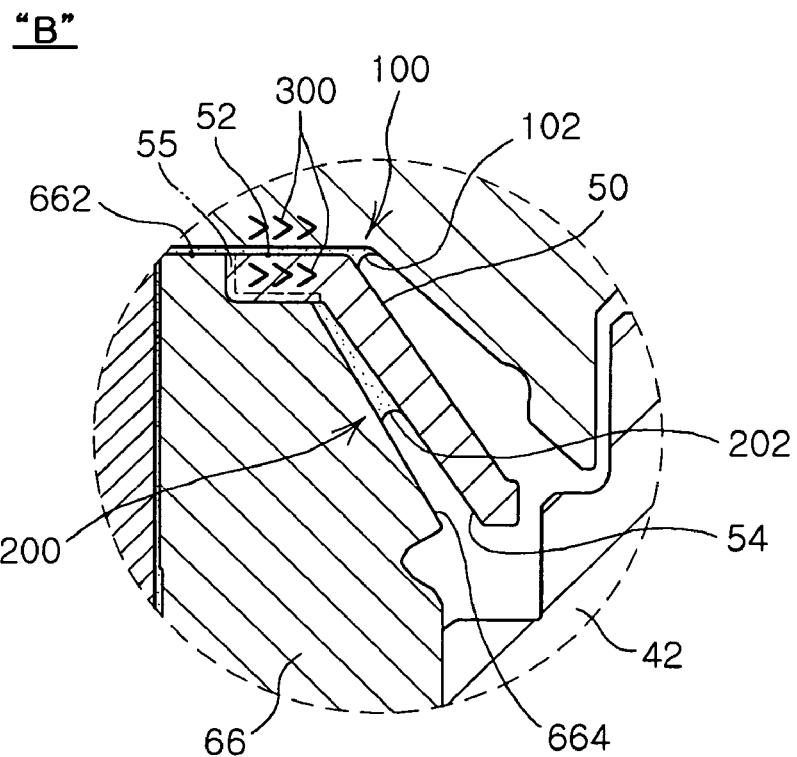
FIG. 4 is a schematic enlarged sectional view illustrating the portion B of FIG. 3.

FIG. 3 is a schematic sectional view illustrating a motor according to another exemplary embodiment of the invention. FIG. 4 is a schematic sectional view illustrating a portion B of FIG. 3.

Referring to FIGS. 3 and 4, the motor 10 and the hydrodynamic bearing assembly 60 according to this embodiment may have the same technical features of the motor 10 and the hydrodynamic bearing assembly 60 according to the embodiment, shown in FIGS. 1 and 2, except that a counterpart component forming the first oil sealing unit 100 and the second oil sealing unit 200 are different from those of FIGS. 1 and 2.

In this embodiment, the counterpart component forming the first oil sealing unit 100 together with the hub base 220 may be the sleeve 66 or an oil sealing cap 50 having an upper surface 52 in the same plane as the upper surface of the sleeve 66.

The oil is sealed by capillary action in a fine gap between the upper surface of the oil sealing cap 50, the hub base 220, and the sleeve 66.

The upper end of the sleeve 66 along the outside diameter direction is inclined downwardly in the axial direction during molding, and the upper part of the sleeve 66 is covered with the oil sealing cap 50 having a shape corresponding to the upper end of the sleeve 66.

The first oil interface 102 of the first oil sealing unit 100 may be tapered at the outside of the oil sealing cap 50 in the outer diameter direction thereof.

The second oil sealing unit 200 may have the second oil interface 202 between an external surface 664 of the sleeve 66 along the outer diameter direction thereof and an internal surface 54 of the oil sealing cap 50 along the inner diameter direction thereof forming a tapered space with the external surface 664 of the sleeve 66 along the outer diameter direction thereof.

The tapered space may be expanded downwardly in the axial direction.

Here, in order that the oil in the first oil sealing unit 100 moves toward the second oil sealing unit 200 along the inner diameter direction by the rotation of the rotor case 22, the first oil sealing unit 100 and the second oil sealing unit 200 may communicate with each other through the communication channel 55.

The communication channel 55 may be formed in an upper portion of the oil sealing cap 50 and a contact between the oil sealing cap 50 and the sleeve 66.

Figure 5:
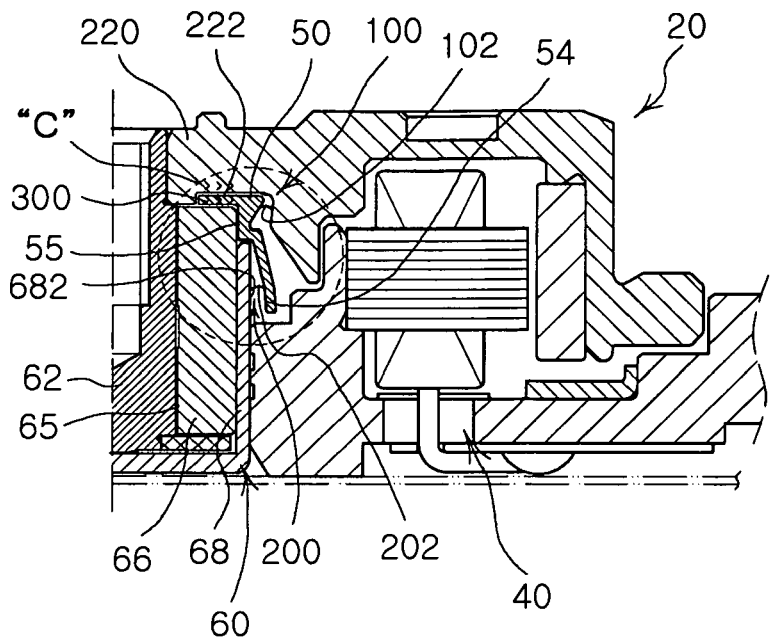
FIG. 5 is a schematic sectional view illustrating a motor according to another exemplary embodiment of the present invention.
Figure 6:
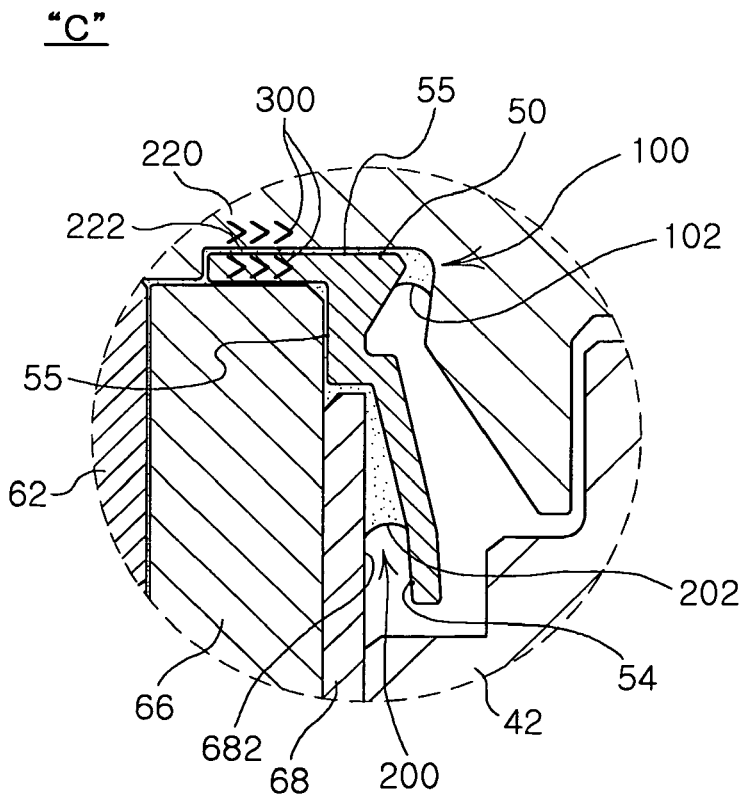
FIG. 6 is a schematic enlarged sectional view illustrating a portion C of FIG. 5.

FIG. 5 is a schematic sectional view illustrating a motor according to another exemplary embodiment of the invention. FIG. 6 is a schematic enlarged sectional view illustrating a portion C of FIG. 5.

Referring to FIGS. 5 and 6, the motor 10 and the hydrodynamic bearing assembly 60 according to this embodiment may further include a sleeve housing 68 into which an outer circumferential surface of the sleeve 66 is inserted to thereby support the sleeve 66.

Unlike the above-described embodiments, the upper end of the sleeve 66 along the outer diameter direction is not inclined.

The counterpart component forming the first oil sealing unit 100 together with the hub base 220 may be the oil sealing cap 50 that covers an upper surface 662 of the sleeve 66.

The oil sealing cap 50 may cover the upper surface 662 of the sleeve 66 and an outer circumferential surface of the sleeve housing 68.

Here, the second oil sealing unit 200 may have the second oil interface 202 between an external surface 682 of the sleeve housing 68 along the outer diameter direction thereof and the internal surface 54 of the oil sealing cap 50 along the inner diameter direction forming a tapered space together with the external surface 682 of the sleeve housing 68 along the outer diameter direction thereof.

The tapered space may be expanded downwardly in the axial direction.

Here, in order that the oil in the first oil sealing unit 100 moves toward the second oil sealing unit 200 along the inner diameter direction by the rotation of the rotor case 22, the first oil sealing unit 100 and the second oil sealing unit 200 may communicate with each other through the communication channel 55.

The communication channel 55 may be formed in the upper portion of the oil sealing cap 50 and a contact between the oil sealing cap 50 and the sleeve 66.

Another structure forming the motor 10 and the hydrodynamic bearing assembly 60 according to this embodiment may be the same as the structure of the embodiment described with reference to FIGS. 1 and 2.

Figure 7:
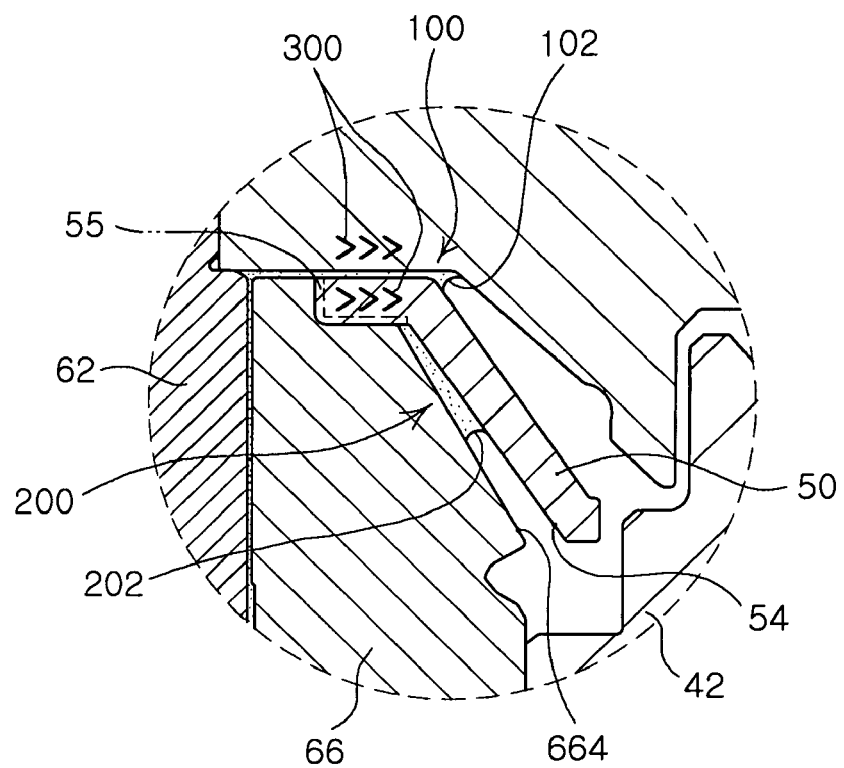
FIG. 7 is a schematic view illustrating the portion B of FIG. 3 to show a state in which oil is sealed before a motor is driven.
Figure 8:
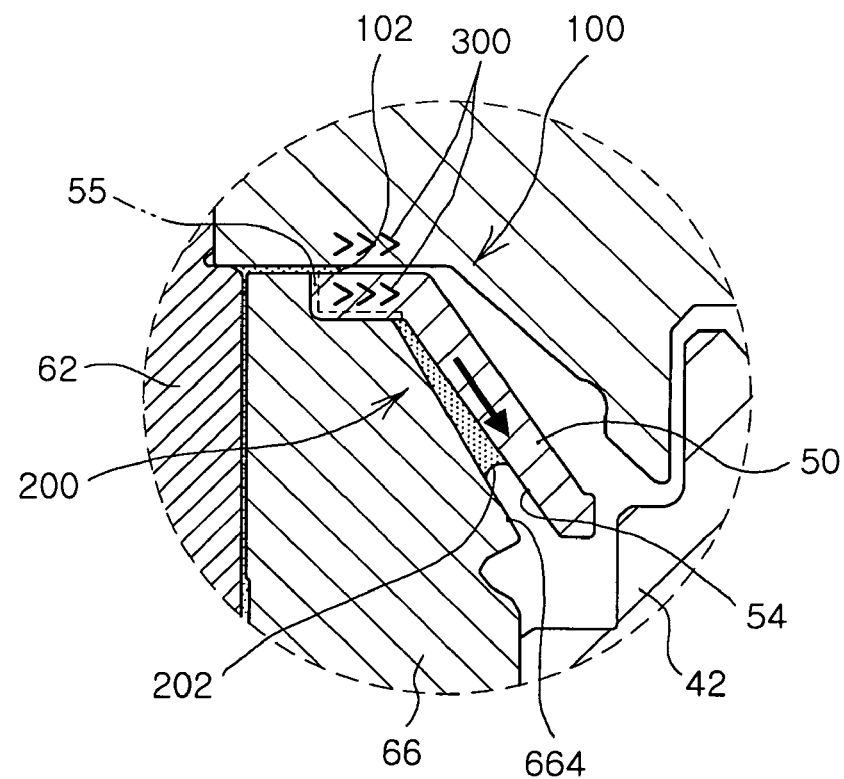
FIG. 8 is a schematic view illustrating the portion B of FIG. 3 to show a state in which an oil interface moves after the motor is driven.

FIG. 7 is a schematic view illustrating the portion B of FIG. 3 to show a state in which oil is sealed before a motor is driven. FIG. 8 is a schematic view illustrating the portion B of FIG. 3 to show a state in which an oil interface moves after the motor is driven.

Referring to FIGS. 7 and 8, how oil moves when the rotor case 22 rotates by the driving of the motor 10 will be described. Here, the portion B of FIG. 3 is used to make the description. However, the portion A of FIG. 1 and the portion C of FIG. 5 may also be used to describe how oil moves.

The pumping grooves 300 may be formed in the sleeve 66 so that the first interface 102 of the first oil sealing unit 100 moves to the inside of the inner diameter direction by the rotation of the rotor case 22 and then finally to the second oil sealing unit 200.

In this embodiment, since the counterpart component of the hub base 220 is the sleeve 66 or the oil sealing cap 50 having the upper surface in the same plane as the upper surface of the sleeve 66, the pumping grooves 300 may be formed in the lower surface of the hub base 200, the upper surface of the sleeve 66 or the sleeve 66.

Here, the pumping grooves 300 may be formed further to the outside along the outer diameter direction than the communication channel 55 so that the oil in the first oil sealing unit 100 can move smoothly toward the second oil sealing unit 200.

As such, as the pumping grooves 300 are arranged adjacent to the first oil sealing unit 100, the oil in the first oil sealing unit 100 smoothly moves to the second oil sealing unit 200.

In the embodiment, described with reference to FIG. 5, the pumping grooves 300 may be formed in at least one of the lower surface of the hub base 220, the sleeve 66, and the upper surface of the oil sealing cap 50 covering the sleeve housing 68.

As the pumping grooves 300 are formed further to the outside along the outer diameter direction than the communication channel 55, the oil in the first oil sealing unit 100 moves to the inside of the inner diameter direction by the rotation of the motor and moves to the second oil sealing unit 200 through the communication channel 55.

That is, the oil between the rotary part of the hub base 220 and the stationary part, which is the counterpart component, moves between the oil sealing cap 50 and the sleeve 66, which are the stationary parts. Therefore, by moving the oil so that oil is disposed between the stationary parts, a rotating frictional force is thus reduced.

Furthermore, as the oil in the first oil sealing unit 100 moves along the inner diameter direction, it is possible to prevent oil splashing due to the high-speed rotation of the motor.

The above-described effects can provide the motor 10 with help to achieve the low current consumption.

The embodiment associated with a groove pattern of the pumping grooves 300 will be described below.

Figure 9:
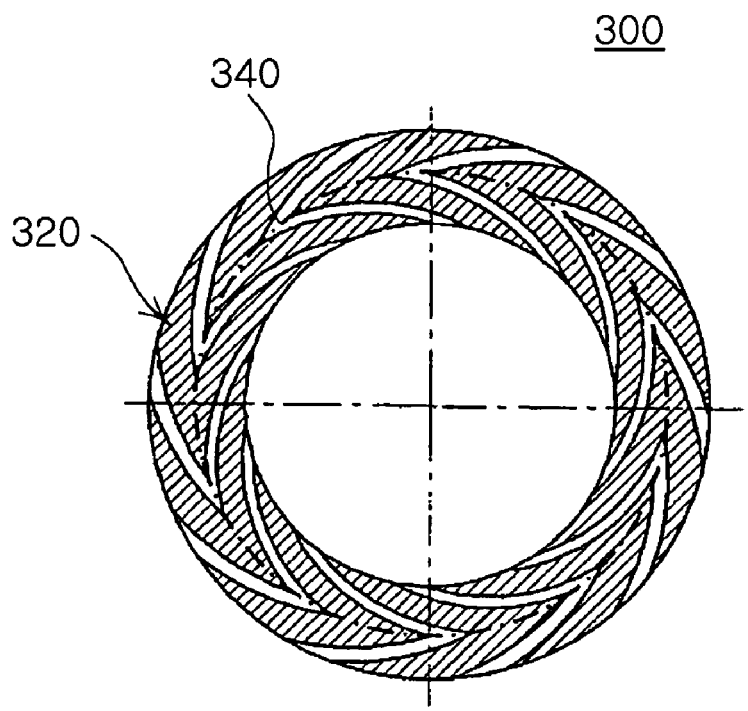
FIG. 9 is a pattern view illustrating herringbone grooves of a thrust hydrodynamic bearing that are formed in a sleeve according to an exemplary embodiment of the present invention.
Figure 10:
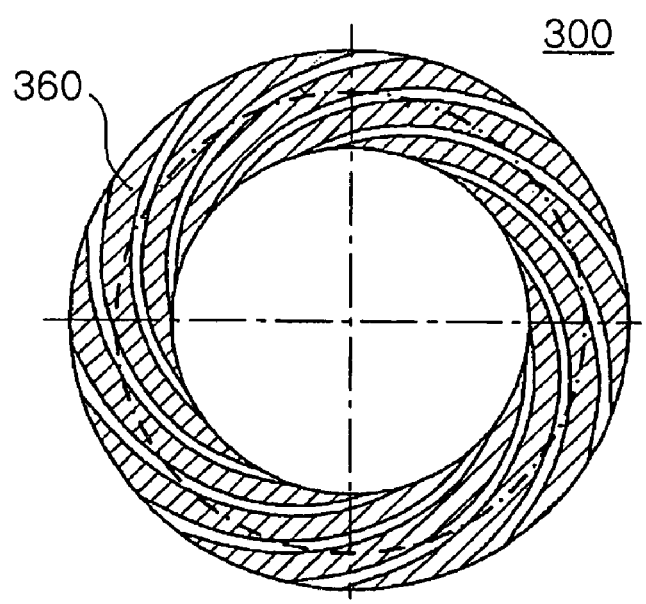
FIG. 10 is a pattern view illustrating spiral grooves of a thrust hydrodynamic bearing that are formed in a sleeve according to another exemplary embodiment of the present invention.

FIG. 9 is a pattern view illustrating herringbone grooves of a thrust hydrodynamic bearing that are formed in a sleeve according to an exemplary embodiment of the invention. FIG. 10 is a pattern view illustrating spiral grooves of a thrust hydrodynamic bearing that are formed in a sleeve according to another exemplary embodiment of the invention.

The pumping grooves 300, shown in FIG. 9, which have an in-pump herringbone structure, are formed of continuous herringbone grooves 320 having intermediate curved portions 340. The pumping grooves 300, shown in FIG. 10, which has a spiral shape, include continuous spiral grooves 360.

As set forth above, according to exemplary embodiments of the invention, the hydrodynamic bearing assembly and the motor having the same can maintain a long bearing span of a shaft so that the shaft can stably support a rotor.

Furthermore, a first oil sealing unit is formed in a counterpart component opposing a lower surface of a hub base, and a second oil sealing unit communicating with the first oil sealing unit and being tapered inside or outside the sleeve is formed, thereby increasing the oil content and preventing oil from being leaked outside oil interfaces.

Furthermore, the oil interface in the first oil sealing unit moves along an inner diameter direction during the rotation of the rotor between the lower surface of the hub base and the counterpart component, thereby preventing oil splashing, reducing friction torque and achieving low current consumption.

While the present invention has been shown and described in connection with the exemplary embodiments, it will be apparent to those skilled in the art that modifications and variations can be made without departing from the spirit and scope of the invention as defined by the appended claims.

What is claimed is:

1. A hydrodynamic bearing assembly comprising:
   a sleeve against which a shaft is supported so that an upper end of the shaft, being compressed and inserted into a hub base of a rotor case, protrudes upwardly in an axial direction;
   a first oil sealing unit having a first oil interface provided between the hub base and a counterpart component arranged downwardly in the axial direction and having a tapered outer circumferential surface to increase a diameter downwardly in the axial direction; and
   a second oil sealing unit communicating with the first oil sealing unit through a communication channel and being tapered to form a second oil interface inside or outside the sleeve,
   wherein oil in the first oil sealing unit moves toward the second oil sealing unit along an inner diameter direction by a rotation of the rotor case.

2. The hydrodynamic bearing assembly of claim 1, wherein the counterpart component is the sleeve or an oil sealing cap having an upper surface in the same plane as an upper surface of the sleeve.

3. The hydrodynamic bearing assembly of claim 1, wherein a pumping groove is provided in at least one of a lower surface of the hub base and an upper surface of the counterpart component, the pumping groove located further outside along the outer diameter direction than the communication channel.

4. The hydrodynamic bearing assembly of claim 3, wherein the counterpart component is the sleeve.

5. The hydrodynamic bearing assembly of claim 3, wherein the counterpart component is the sleeve or an oil sealing cap having an upper surface in the same plane as an upper surface of the sleeve.

6. The hydrodynamic bearing assembly of claim 3, wherein the pumping groove has a spiral shape or an in-pump herringbone shape.

7. A motor comprising:
   the hydrodynamic bearing assembly of claim 1 supporting a shaft;
   a stator having a support to which the hydrodynamic bearing assembly is fixed; and
   a rotor having a magnet generating an electromagnetic force by interaction between a coil of the stator and the magnet.

8. A hydrodynamic bearing assembly comprising:
   a sleeve against which a shaft is supported so that an upper end of the shaft, being compressed and inserted into a hub base of a rotor case, protrudes upwardly in an axial direction;
   a first oil sealing unit having a first oil interface provided between the hub base and a counterpart component arranged downwardly in the axial direction; and
   a second oil sealing unit communicating with the first oil sealing unit through a communication channel and being tapered to form a second oil interface inside or outside the sleeve
   wherein oil in the first oil sealing unit moves toward the second oil sealing unit along an inner diameter direction by a rotation of the rotor case, and
   the counterpart component being the sleeve.

9. The hydrodynamic bearing assembly of claim 8, wherein the second oil sealing unit comprises a communication hole extending along an outer diameter direction of the sleeve and inclined downwardly in the axial direction, and
   a second oil surface is provided within the communication hole.

10. The hydrodynamic bearing assembly of claim 9, wherein the second oil sealing unit has the second oil interface between an outer surface of the sleeve along the outer diameter direction and an inner surface of an oil sealing cap along the inner diameter direction forming a tapered space with the outer surface of the sleeve along the outer diameter direction.

11. A motor comprising:
    the hydrodynamic bearing assembly of claim 8 supporting a shaft;
    a stator having a support to which the hydrodynamic bearing assembly is fixed; and
    a rotor having a magnet generating electromagnetic force by interaction between a coil of the stator and the magnet.

12. A hydrodynamic bearing assembly comprising:
    a sleeve against which a shaft is supported so that an upper end of the shaft, being compressed and inserted into a hub base of a rotor case, protrudes upwardly in an axial direction;
    a first oil sealing unit having a first oil interface provided between the hub base and a counterpart component arranged downwardly in the axial direction;
    a second oil sealing unit communicating with the first oil sealing unit through a communication channel and being tapered to form a second oil interface inside or outside the sleeve; and a sleeve housing engaged with an outer circumferential surface of the sleeve to support the sleeve, wherein oil in the first oil sealing unit moves toward the second oil sealing unit along an inner diameter direction by a rotation of the rotor case, and wherein the counterpart component is the sleeve or an oil sealing cap covering an outer circumferential surface of the sleeve housing.

13. The hydrodynamic bearing assembly of claim 12, wherein the second oil sealing unit has the second oil interface between an outer surface of the sleeve housing along an outer diameter direction and an inner surface of the oil sealing cap along the inner diameter direction forming a tapered space with the outer surface of the sleeve housing.

14. A motor comprising:
the hydrodynamic bearing assembly of claim 12 supporting a shaft;
a stator having a support to which the hydrodynamic bearing assembly is fixed; and
a rotor having a magnet generating electromagnetic force by interaction between a coil of the stator and the magnet.

15. A hydrodynamic bearing assembly comprising:
a sleeve against which a shaft is supported so that an upper end of the shaft, being compressed and inserted into a hub base of a rotor case, protrudes upwardly in an axial direction;
a first oil sealing unit having a first oil interface provided between the hub base and a counterpart component arranged downwardly in the axial direction;
a second oil sealing unit communicating with the first oil sealing unit through a communication channel and being tapered to form a second oil interface inside or outside the sleeve; and
a sleeve housing engaged with an outer circumferential surface of the sleeve to support the sleeve,
wherein oil in the first oil sealing unit moves toward the second oil sealing unit along an inner diameter direction by a rotation of the rotor case, and
wherein the counterpart component is the sleeve or an oil sealing cap covering an outer circumferential surface of the sleeve housing.

16. A motor comprising:
the hydrodynamic bearing assembly of claim 15 supporting a shaft;
a stator having a support to which the hydrodynamic bearing assembly is fixed; and
a rotor having a magnet generating electromagnetic force by interaction between a coil of the stator and the magnet.

* * * * *

UNITED STATES PATENT AND TRADEMARK OFFICE
CERTIFICATE OF CORRECTION

PATENT NO. : 8,388,227 B2
APPLICATION NO. : 12/662917
DATED : March 5, 2013
INVENTOR(S) : Chang Jo Yu It is certified that error appears in the above-identified patent and that said Letters Patent is hereby corrected as shown below:

In the Claims

Column 8, Line 30, In Claim 8, delete "sleeve" and insert --sleeve,--, therefor.

Signed and Sealed this
Second Day of July, 2013

Teresa Stanek Rea
*Acting Director of the United States Patent and Trademark Office*